(12) United States Patent
Wachter et al.

(10) Patent No.: US 8,909,257 B2
(45) Date of Patent: Dec. 9, 2014

(54) POSITIONING PROTOCOL CONVEYANCE

(75) Inventors: Andreas K. Wachter, San Carlos, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 13/081,416

(22) Filed: Apr. 6, 2011

(65) Prior Publication Data

US 2011/0312280 A1 Dec. 22, 2011

Related U.S. Application Data

(60) Provisional application No. 61/356,581, filed on Jun. 19, 2010.

(51) Int. Cl.
*H04W 4/02* (2009.01)
*H04W 64/00* (2009.01)
*G01S 5/00* (2006.01)
*G01S 19/03* (2010.01)

(52) U.S. Cl.
CPC .............. *H04W 4/02* (2013.01); *G01S 5/0018* (2013.01); *G01S 5/0045* (2013.01); *G01S 5/009* (2013.01); *G01S 19/03* (2013.01); *H04W 64/00* (2013.01)
USPC .................. 455/456.5; 455/456.1; 455/456.2; 455/456.3

(58) Field of Classification Search
USPC ........................................... 455/456.1–456.6
See application file for complete search history.

(56) References Cited

U.S. PATENT DOCUMENTS

| | | |
|---|---|---|
| 2006/0223490 A1 | 10/2006 | Kim et al. |
| 2007/0072624 A1 | 3/2007 | Niemenmaa et al. |
| 2007/0182547 A1 | 8/2007 | Wachter et al. |
| 2008/0045237 A1 | 2/2008 | Yan |
| 2009/0083430 A1* | 3/2009 | Edge et al. ..................... 709/228 |
| 2009/0181698 A1 | 7/2009 | Farmer et al. |
| 2009/0216846 A1 | 8/2009 | Burroughs et al. |
| 2009/0280804 A1* | 11/2009 | Shim ............................ 455/433 |
| 2010/0062752 A1 | 3/2010 | Shim |
| 2011/0071926 A1* | 3/2011 | Wirola et al. ................ 705/27.1 |
| 2013/0030684 A1* | 1/2013 | Wirola .......................... 701/300 |

FOREIGN PATENT DOCUMENTS

| | | |
|---|---|---|
| WO | WO-2009089486 A1 | 7/2009 |
| WO | WO-2009108585 A1 | 9/2009 |

OTHER PUBLICATIONS

IEEE 100 The Authoritative Dictionary of IEEE Standards Terms, Dec. 2000, the Institute of Electrical and Electronics Engineers, Inc., pp. 1031-1032.*

(Continued)

*Primary Examiner* — Gennadiy Tsvey
(74) *Attorney, Agent, or Firm* — Arnold J. Gum

(57) ABSTRACT

Techniques for selecting positioning protocols consistent with the capabilities of the location server in a Secure User Plane Location (SUPL) based service are described. The SUPL Location Platform (SLP) transmits the service capabilities of the SLP, such as the positioning protocol capabilities of the SLP. The SLP transmits its capabilities of the SLP in an initiation message to the SUPL enabled terminal (SET) or after receiving an initiation message from the SET. The SET may transmit a positioning initiation message and the SLP and SET communicate to determine one or more position estimates for the SET. The SET may include in the positioning initiation message a positioning protocol positioning message that is consistent with the SLP service capabilities.

25 Claims, 6 Drawing Sheets

(56) References Cited

OTHER PUBLICATIONS

Wirola, L., Expert Advice: Positioning Protocol for Next-Gen Cell Phones, Mar. 1, 2011, available at http://gpsworld.com/wirelessexpert-advice-positioning-protocol-next-gen-cell-phones-11125/.*

Tolga Göze, Özgün Bayrak, Metin Barut, M. Oğuz Sunay, "Secure User-Plane Location (SUPL) Architecture for Assisted GPS (A-GPS)," Proceedings of the IEEE Advanced Satel lite Mobile Systems Conference, Bologna, Italy, Aug. 26-28, 2008.

International Search Report and Written Opinion—PCT/US2011/040966, International Search Authority—European Patent Office—Sep. 20, 2011.

Taiwan Search Report—TW100121452—TIPO—Jul. 25, 2013.

Open Mobile Alliance: "Secure User Plane Location Architecture," OMA-AD-SUPL-V1_0-20050719-C, Jul. 19, 2005, Candidate Version 1.0, pp. 1-80.

"UserPlane Location Protocol," Draft Version 2.0—Jun. 8, 2010, Open Mobile Alliance, OMA-TS-ULP-V2_0-20100608-D, Open Mobile Alliance Ltd., 2010, pp. 1-406.

* cited by examiner

POSITIONING PROTOCOL CONVEYANCE

CROSS-REFERENCE TO RELATED APPLICATION(S)

This application claims priority under 35 USC 119 to U.S. Provisional application No. 61/356,581, filed Jun. 19, 2010, and entitled "Positioning Protocol Conveyance"; which is assigned to the assignee hereof and is incorporated herein by reference.

BACKGROUND

It is often desirable, and sometimes necessary, to know the location or position of a wireless device in a network. The terms "location" and "position" are synonymous and are used interchangeably herein. For example, a user may utilize the wireless device to browse through a website and may click on location sensitive content. A web server may then query the network for the position of the wireless device. The network may initiate position processing with the wireless device in order to ascertain the position of the wireless device. The network may then return a position estimate for the wireless device to the web server, which may use this position estimate to provide appropriate content to the user. There are many other scenarios in which knowledge of the position of the wireless device is useful or necessary.

A message flow (which may also be called a call flow or a procedure) is typically executed in order to obtain a position estimate for the wireless device and to send this position estimate to a client entity, e.g., the web server. Various messages are typically exchanged between one or more network entities, the wireless device, and the client entity for the message flow. These messages ensure that each entity is provided with pertinent information, or can obtain this information from another entity, in order to carry out positioning for the wireless device and/or to deliver the position estimate to the client entity. However, these messages add to the traffic among the various network entities. The additional traffic may be especially great for location services in which a position estimate for the wireless device is periodically provided to the client entity. The messages may also extend the response time for sending the position estimate to the client entity.

One commonly used protocol for location based services is known as Secure User Plane Location (SUPL) 2.0. In the SUPL 2.0 protocol, assistance and positioning data is sent over the user's traffic channel using a secure connection between the SUPL enabled Terminal (SET) and the SUPL Location Platform (SLP) on the network side. While SUPL 2.0 is a secure means to efficiently provide location based services, improvements are desirable.

SUMMARY

Techniques for selecting positioning protocols consistent with the capabilities of the location server in a Secure User Plane Location (SUPL) based service are described. The SUPL Location Platform (SLP) transmits the service capabilities of the SLP, such as the positioning protocol capabilities of the SLP. The SLP transmits its capabilities of the SLP in an initiation message to the SUPL enabled terminal (SET) or after receiving an initiation message from the SET. The SET may transmit a positioning initiation message and the SLP and SET communicate to determinate one or more position estimates for the SET. The SET may include in the positioning initiation message a positioning message that is consistent with the SLP service capabilities.

In an embodiment, an apparatus includes at least one processor configured to receive from a Secure User Plane Location (SUPL) agent a request for position estimates for a SUPL enabled terminal (SET) and to provide an initiation message to the SET to start a location session, the initiation message including service capabilities of the processor. The processor is configured to receive capabilities of the SET from the SET, to communicate with the SET to determine at least one position estimate for the SET, and to send the position estimate to the SUPL agent. The processor may be further configured to receive from the SET a positioning initiation message that includes a positioning message using a positioning protocol that is within the positioning protocol capabilities of the processor.

In another embodiment, a method includes receiving from a Secure User Plane Location (SUPL) agent a request for position estimates for a SUPL enabled terminal (SET), and providing an initiation message from a SUPL Location Platform (SLP) to the SET to start a location session, the initiation message including service capabilities of the SLP. The method further includes receiving capabilities of the SET from the SET, communicating with the SET to determine at least one position estimate for the SET, and sending the position estimate to the SUPL agent. The method may further include receiving from the SET a positioning initiation message that includes a positioning message using a positioning protocol that is within the positioning protocol capabilities of the SLP.

In another embodiment, a system includes means for receiving from a Secure User Plane Location (SUPL) agent a request for position estimates for a SUPL enabled terminal (SET) and means for providing an initiation message from a SUPL Location Platform (SLP) to the SET to start a location session, the initiation message including service capabilities of the SLP. The system may further include means for receiving capabilities of the SET from the SET, means for communicating with the SET to determine at least one position estimate for the SET, and means for sending the position estimate to the SUPL agent. The system may further include means for receiving from the SET a positioning initiation message that includes a positioning message using a positioning protocol that is within the positioning protocol capabilities of the SLP.

In yet another embodiment, a computer-readable medium including program code stored thereon includes program code to receive from a Secure User Plane Location (SUPL) agent a request for position estimates for a SUPL enabled terminal (SET) and program code to provide an initiation message from a SUPL Location Platform (SLP) to the SET to start a location session, the initiation message including service capabilities of the SLP. The computer-readable medium further includes program code to receive capabilities of the SET from the SET, program code to communicate with the SET to determine at least one position estimate for the SET, and program code to send the position estimate to the SUPL agent. The computer-readable medium may further include program code to receive from the SET a positioning initiation message that includes a positioning message using a positioning protocol that is within the positioning protocol capabilities of the SLP.

In another embodiment, at least one processor is configured to receive a request from a Secure User Plane Location (SUPL) agent for position estimates for a SUPL enabled terminal (SET) and provide an initiation message to a SUPL Location Platform (SLP) to start a location session, the initiation message including service capabilities of the SET. The processor is further configured to receive from the SLP service capabilities of the SLP, wherein the SLP service capabilities of the SLP are received without a preceding request for the SLP service capabilities of the SLP, to communicate with the SLP to determine at least one position estimate for the SET, and to provide to the SUPL agent at least one position estimate for the SET.

The processor may be further configured to provide to the SLP a positioning initiation message that includes a positioning message using a positioning protocol that is within the positioning protocol capabilities of the SLP.

In another embodiment, a method includes receiving a request from a Secure User Plane Location (SUPL) agent for position estimates for a SUPL enabled terminal (SET) and providing an initiation message to a SUPL Location Platform (SLP) to start a location session, the initiation message including service capabilities of the SET. The method further includes receiving from the SLP service capabilities of the SLP, wherein the SLP service capabilities of the SLP are received without a preceding request for the SLP service capabilities of the SLP, communicating with the SLP to determine at least one position estimate for the SET, and providing to the SUPL agent at least one position estimate for the SET. The method may further include providing to the SLP a positioning initiation message that includes a positioning message using a positioning protocol that is within the positioning protocol capabilities of the SLP.

In another embodiment, a system includes means for receiving a request from a Secure User Plane Location (SUPL) agent for position estimates for a SUPL enabled terminal (SET) and means for providing an initiation message to a SUPL Location Platform (SLP) to start a location session, the initiation message including service capabilities of the SET. The system further includes means for receiving from the SLP service capabilities of the SLP, wherein the SLP service capabilities of the SLP are received without a preceding request for the SLP service capabilities of the SLP, means for communicating with the SLP to determine at least one position estimate for the SET, and means for providing to the SUPL agent at least one position estimate for the SET. The system may further include means for providing to the SLP a positioning initiation message that includes a positioning message using a positioning protocol that is within the positioning protocol capabilities of the SLP.

In yet another embodiment, a computer-readable medium including program code stored thereon includes program code to receive a request from a Secure User Plane Location (SUPL) agent for position estimates for a SUPL enabled terminal (SET) and program code to provide an initiation message to a SUPL Location Platform (SLP) to start a location session, the initiation message including service capabilities of the SET. The computer-readable medium may include program code to receive from the SLP service capabilities of the SLP, wherein the SLP service capabilities of the SLP are received without a preceding request for the SLP service capabilities of the SLP, program code to communicate with the SLP to determine at least one position estimate for the SET, and program code to provide to the SUPL agent at least one position estimate for the SET. The computer-readable medium may further include program code to provide to the SLP a positioning initiation message that includes a positioning message using a positioning protocol that is within the positioning protocol capabilities of the SLP.

Various aspects and embodiments of the disclosure are also described in further detail below.

DETAILED DESCRIPTION

Figure 1:
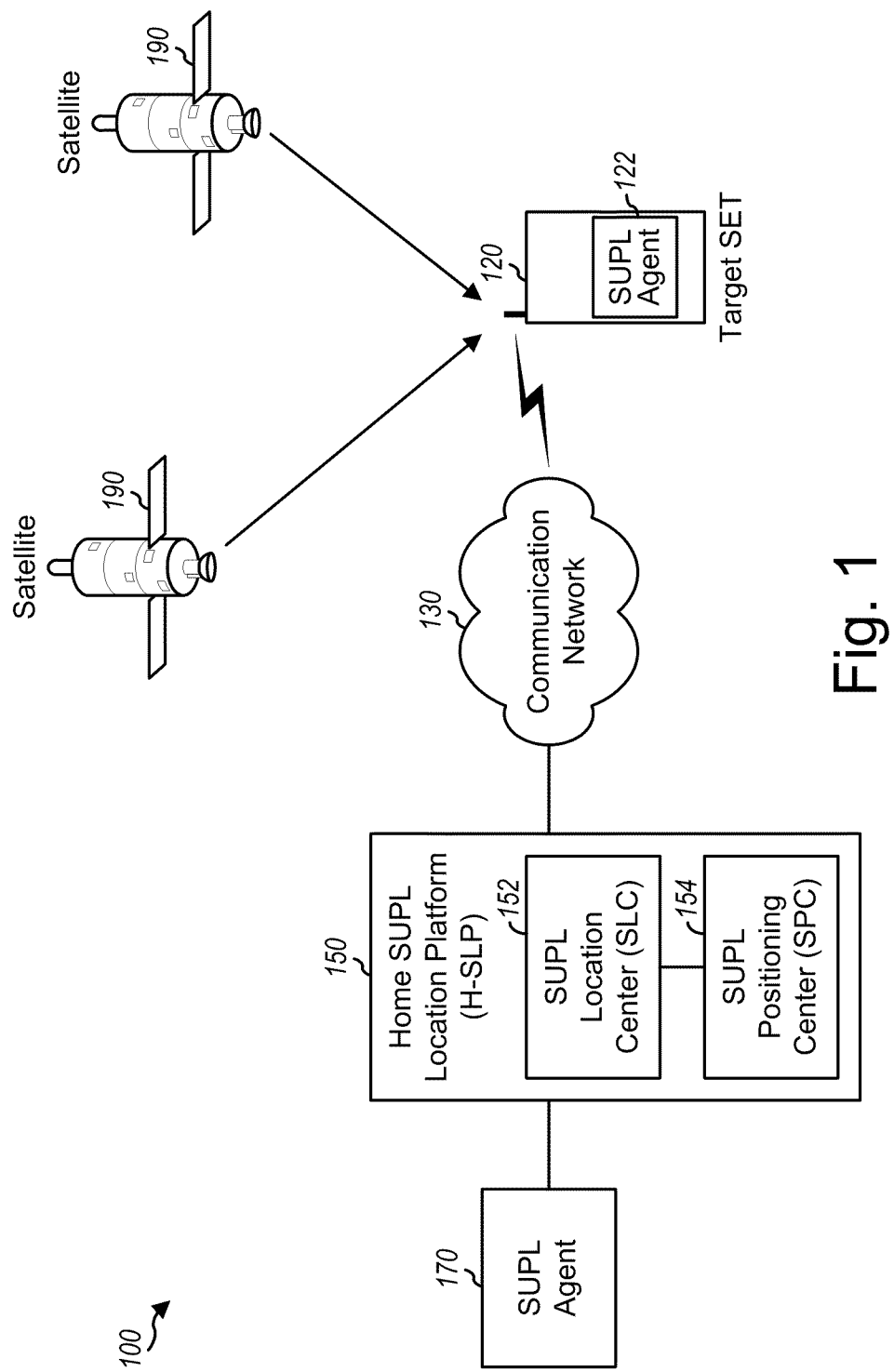
FIG. 1 shows a network architecture capable of providing location services for SUPL enabled terminals (SETs).

User Plane location based service solutions, such as Secure User Plane Location (SUPL), may employ multiple positioning protocols (e.g. LPP, LPPe, TIA-801, etc.) for positioning. A positioning protocol is a protocol used between a server (e.g. SLP) and a terminal or other device (e.g. a SET) that supports one or more positioning methods that are able to determine the location of the terminal or device. Examples of positioning protocols include LTE Positioning Protocol (LPP) defined in 3GPP Technical Specification (TS) 35.355, LPP Extensions (LPPe) defined in OMA-TS-LPPe-V1_0 from the Open Mobile Alliance (OMA), TIA-801 defined in 3GPP2 C.S0022, Radio Resource Control (RRC) defined in 3GPP TS 25.331 and Radio Resource LCS Protocol (RRLP) defined in 3GPP TS 44.031. These specifications are all publicly available from the Third Generation Partnership Project (3GPP), Third Generation Partnership Project 2 (3GPP2) and OMA as applicable. Note that LPPe is defined to be used in combination with LPP and the combined protocol may be referred to as LPP/LPPe, LPP+LPPe or simply as LPPe (where combination with LPP is assumed implicitly). Use of a positioning protocol between a server and a device may require a selection mechanism in order to be able to invoke a positioning protocol supported by both the location server and the target device. Without a selection mechanism, the location server and target device may not be able to conduct a positioning session or may not be able to conduct a positioning session efficiently in cases where the location server does not support the positioning protocol selected by the target client and vice versa. As a result, the User Plane positioning session may need to be aborted and either may not be restarted resulting in a failed location attempt or may be restarted with a different positioning protocol resulting in successful location but with delays and wasted network resources. Accordingly, at the beginning of a user plane positioning session, the location server conveys the positioning protocol capabilities of the location server to the target device enabling the target device to select the appropriate positioning protocol for use during the positioning session.

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, networks supporting a combination of the aforementioned technologies, networks with wireless wide area network (WWAN) coverage and/or wireless local area network (WLAN) coverage, a wireless personal area network (WPAN). A CDMA network may implement one or more radio access technologies (RATs) such as Wideband-CDMA (W-CDMA), cdma2000, and so on. Cdma2000 covers IS-2000, IS-856, and IS-95 standards. A TDMA network may implement one or more radio technologies such as Global System for Mobile Communications (GSM), Digital Advanced Mobile Phone System (D-AMPS) or some other RAT. D-AMPS covers IS-136 and IS-54. An OFDMA network may implement one or more radio technologies such as Long Term Evolution (LTE) or LTE Advanced (LTE-A). These various radio technologies and standards are known in the art. LTE, LTE-A, W-CDMA and GSM are described in documents from an organization named "3rd Generation Partnership Project" (3GPP). Cdma2000 is described in documents from an organization named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The techniques may also be used to help locate a device communicating using a wireline IP capable network such as a network providing DSL or cable access and/or may be used to support client devices communicating using a wireline network.

The techniques may also be used for various location architectures such as user plane architectures. A user plane is a mechanism for carrying data for higher-layer applications and employing a user-plane bearer, which is typically implemented with protocols such as User Datagram Protocol (UDP), Transmission Control Protocol (TCP), and Internet Protocol (IP), all of which are known in the art. Messages supporting location services and positioning are carried as part of data in a user plane architecture. The techniques may be used for Secure User Plane Location (SUPL) and pre-SUPL architectures promulgated by Open Mobile Alliance (OMA), a 3GPP2 user plane architecture described in X.S0024, and so on. For clarity, the techniques are described below for Secure User Plane Location (SUPL).

FIG. 1 shows a network architecture 100 capable of providing location services for SUPL enabled terminals (SETs). A SET is a device capable of communicating with SUPL capable entities that support positioning and location services for SETs. For simplicity, only one SET 120 is shown in FIG. 1. SET 120 may be stationary or mobile and may also be called a mobile station (MS), a user equipment (UE), a terminal, a station, a subscriber unit, or some other terminology. SET 120 may be a cellular phone, a personal digital assistant (PDA), a wireless modem, a personal computer, a laptop computer, a telemetry device, a tracking device, and so on. For example, SET 120 may be a UE in Universal Mobile Telecommunication System (UMTS), an MS in GSM or cdma2000, a personal computer in an IP-based network, and so on.

SET 120 may include a SUPL agent 122 capable of accessing SUPL capable entities. SET 120 may also be a target SET, which is a SET whose position is being sought by a SUPL agent that may be internal or external to the SET. SET 120 may perform functions such as privacy, security, positioning measurement and position calculation for location services.

SET 120 may communicate with a communication network 130 for various services such as voice, packet data, messaging, and so on. SET 120 may also communicate with SUPL capable entities via network 130. Network 130 may be a wireless network such as a cdma2000 network, a UMTS network, an LTE network, a GSM network, some other radio access network (RAN), a WLAN, and so on. Network 130 may also be a wireline network such as an IP-based network, a phone network, a cable network, and so on. In some cases, network 130 may comprise multiple individual networks (e.g. an LTE network and a separate UMTS network each connected to the Internet). In such a case, SET 120 and H-SLP 150 may connect to different networks—e.g. SET 120 may connect to an LTE network whereas H-SLP may connect to a UMTS network. SET 120 may also receive signals from one or more satellites 190, which may be part of the Global Positioning System (GPS), the European Galileo system, the Russian Glonass system, or some other satellite positioning system. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

SET 120 may measure signals from satellites 190, base stations, wireless access points, femtocells, etc. in network 130 and may obtain pseudo-range measurements for the satellites and network measurements from the base stations. The satellite pseudo-range and/or network measurements may be used to derive a position estimate for SET 120.

A Home SUPL Location Platform (H-SLP) 150 is responsible for SUPL service management and position determination. SUPL service management may include managing locations of SETs and storing, extracting, and modifying location information of target SETs. H-SLP 150 includes a SUPL Location Center (SLC) 152 and typically includes a SUPL Positioning Center (SPC) 154. SLC 152 performs various functions for location services, coordinates the operation of SUPL, and interacts with SETs over user plane bearer. SLC 152 may perform functions for privacy, initiation, security, roaming support, charging/billing, service management, position calculation, and so on. SPC 154 supports positioning for SETs, is responsible for messages and procedures used for position calculation, and supports delivery of assistance data to the SETs. SPC 154 may perform functions for security, assistance data delivery, reference retrieval, position calculation, and so on. An SPC has access to GPS receivers (a reference network, perhaps a global one) and receives signals for satellites so that it can provide assistance data.

A SUPL agent (e.g., SUPL agent 122 or 170) is a function or an entity that obtains location information for a target SET. In general, a SUPL agent may reside in a network entity (e.g., SUPL agent 170) or a SET (e.g., SUPL agent 122) or may be external to both the network and the SET. In the case of a SET resident SUPL agent, the SUPL Agent may or may not access network resources to obtain the location information and, as in SET-based mode, positioning and resource access from the network may not be one-for-one (e.g. a SET may use resources obtained once from the network to support location determination at several different times). A network resident SUPL agent may access an H-SLP or a requesting network, which includes a Requesting SLP (R-SLP) that supports location services for SUPL agents. Location information may be any information related to location and may comprise various types of position estimate (e.g., latitude and longitude coordinates, latitude and longitude with an expected error estimate, etc.).

The SUPL entities in FIG. 1 are similar to those described in U.S. application Ser. No. 11/510,332, filed Aug. 24, 2006, and entitled "Location Reporting with Secure User Plane Location (SUPL)", with Publication No. US 2007/0182547, which is assigned to the assignee hereof and the entirety of which is incorporated herein by reference, as well as document OMA-AD-SUPL-V2_0-20060619-D, entitled "Secure User Plane Location Architecture," Draft Version 2.0, June 2006, which is publicly available from OMA. The network entities in FIG. 1 may also be referred to by other names in other networks and other location architectures. For example, in a 3GPP-based network (e.g., a UMTS network), an SLC may be called a Gateway Mobile Location Center (GMLC), an SPC may be called a Serving Mobile Location Center (SMLC), a SET may be called a UE, and a SUPL agent may be called an LCS client. The functions and signaling performed by the 3GPP entities are similar to those performed by the corresponding SUPL entities, thereby enabling comparable services and capabilities. In general, an SLC may be called a location center, an LCS server, a location server, a Mobile Positioning Center (MPC), and so on. An SPC may be called a positioning entity, a positioning server, a positioning center, a Position Determination Entity (PDE), and so on.

SUPL may support the following positioning methods (among others): SET assisted A-GPS, SET assisted A-GNSS, SET based A-GPS, SET based A-GNSS, Autonomous GPS or autonomous GNSS; Advanced forward link trilateration (A-FLT); SET assisted and/or SET based Enhanced observed time difference (EOTD); SET assisted and/or SET based Observed time difference of arrival (OTDOA) for UMTS and/or for LTE; SET assisted and/or SET based Enhanced cell/sector and cell-ID; SET assisted and/or SET based WiFi positioning, SET assisted and/or SET based Short Range Node (SRN) positioning and various SET assisted and/or SET based Hybrid combinations of these.

For SET based mode, the position of the SET is determined by the SET, possibly with assistance data from an SPC. For SET assisted mode, the position of the SET is determined by the SPC with assistance (e.g., measurements) from the SET. The autonomous GPS/GANSS and A-GPS/A-GANSS methods derive a position estimate for the SET based solely on satellite measurements and have high accuracy. The hybrid method derives a position estimate based on multiple position methods and has high accuracy and high reliability if GPS and/or GNSS are included. The A-FLT, EOTD, and OTDOA methods derive a position estimate based on measurements of base station timing made by the SET and have good accuracy. The cell-ID methods derive a position estimate based on known positions of cell/sectors of a cellular network and have coarse accuracy. For the enhanced cell/sector method, the position estimate may also be derived based on network measurements such as radio signal timing and signal strengths. The WiFi and SRN methods employ signal measurements from WiFi Access Points and short range nodes (e.g. Bluetooth) and normally have high accuracy These various positioning methods are known in the art. The terms "position estimate", "location estimate", and "position fix" are often used interchangeably. A position estimate may be given in absolute coordinates (e.g., latitude and longitude), in relative coordinates (e.g. number of meters north and east of a known fixed location) or as a civic address (e.g. street address, city and country) or as some combination of these and may provide an expected error (e.g. may provide a geographic area that represents possible locations of a SET).

SUPL may support various services, four of which are shown in Table 1.

TABLE 1

| Location Service | Description |
|---|---|
| Immediate location service | Provide location information (e.g., the location of a target SET) immediately when requested. |
| Deferred location service | Provide location information one or multiple times based on periodic triggers or after a specific event has occurred. |
| Assistance data service | Provide single, multiple or continuous assistance data transfer. |
| Generic SUPL Session | Establishment of secure SUPL session context for extended time periods. |

Immediate location services may also be referred to as network initiated, SET initiated, roaming, non-roaming, and so on. Deferred location services may include periodic and/or triggered services. For triggered services, the reporting of position estimates is determined by triggers or trigger mechanism that indicates when to report the SET location to a SUPL agent. The triggers may be determined by the target SET, sent to the H-SLP, and then forwarded to the SUPL agent. Periodic triggers for periodic triggered service may comprise a periodic interval, the number of position reports, and a possible start time to begin reporting. Triggers may be related to area events, a change in the location or velocity of a SET or to other conditions. Area event triggers for area event triggered service may correspond to the SET entering, leaving, or remaining within or remaining outside a predefined geographic area. Triggers related to a change in the location or velocity of a SET may correspond to the SET location, velocity or acceleration changing by predefined thresholds. Triggers may also be combined such that the location of a SET is only obtained when two or more trigger conditions or when one of several alternative triggers have occurred. Additional or other services may also be supported.

Location services may be categorized as shown in Table 2.

TABLE 2

| Location Service Type | Description |
|---|---|
| Network initiated (NI) services | Services that originate from the network, with the SUPL agent residing in or having access to the network. |
| SET initiated (SI) services | Services that originate from the SET, with the SUPL agent residing within or having access to the SET. |

Network initiated may also be referred to as mobile terminated. SET initiated may also be referred to as mobile originated.

SUPL supports two communication modes between a SET and an H-SLP for positioning with an SPC. Table 3 summarizes the two communication modes.

TABLE 3

| Communication Mode | Description |
| --- | --- |
| Proxy mode | The SPC does not have direct communication with the SET, and the SLC acts as a proxy between the SET and the SPC. |
| Non-proxy mode | The SPC has direct communication with the SET. |

SUPL supports roaming and non-roaming for a SET. Table 4 summarizes several roaming and non-roaming modes.

TABLE 4

| Roaming/Non-roaming | Description |
| --- | --- |
| Non-roaming | The SET is within the service area of its H-SLP. |
| Roaming with H-SLP positioning | The SET is outside the service area of its H-SLP, but the H-SLP still provides location functionality. |
| Roaming with V-SLP positioning | The SET is outside the service area of its H-SLP, and a V-SLP provides location functionality |

As used herein, roaming and non-roaming are with respect to SUPL, and not with respect to communication network 130. Network 130 may have different definition and criteria on roaming and non-roaming, which are not discussed herein.

The service area of an H-SLP is an area within which the H-SLP can provide a position estimate for a SET or relevant assistance data to a SET without contacting other SLPs. When the SET is roaming, the H-SLP may provide location functionality (e.g., position determination and assistance data provision) or may request a V-SLP to provide this location functionality.

A set of message flows may be defined for each of the supported location services. Each message flow may be applicable for a specific location service and a specific set of conditions, e.g., proxy or non-proxy, roaming or non-roaming, network initiated or SET initiated, and so on. A specific message flow may be used to obtain the desired location service for the applicable conditions.

Figure 2:
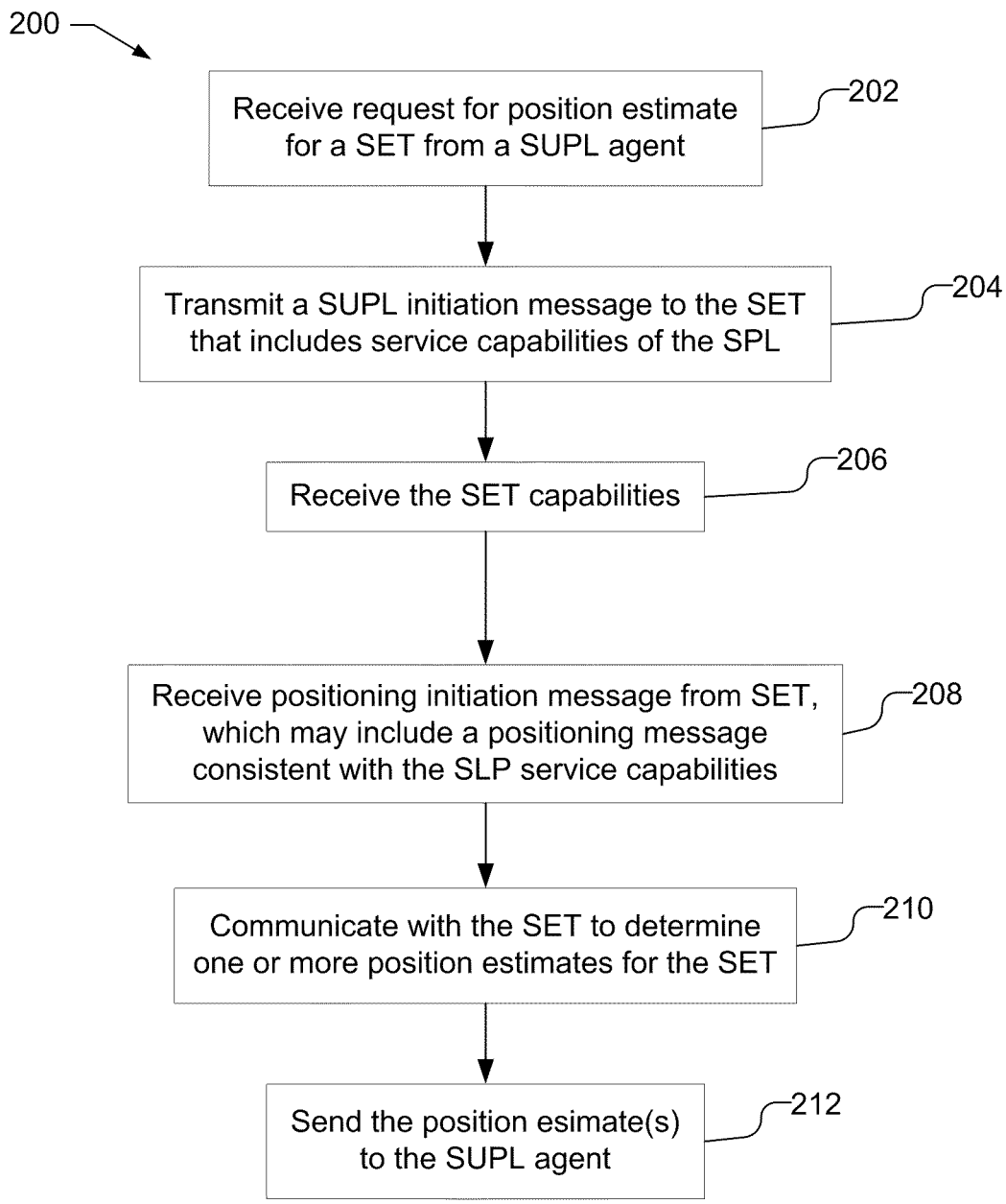
FIG. 2 is a flow chart illustrating a SUPL positioning process in which positioning protocols consistent with the capabilities of the H-SLP are selected.

FIG. 2 is a flow chart 200 illustrating a SUPL positioning process that may be performed by the H-SLP 150 in SUPL ULP architecture 100, in which positioning protocols consistent with the capabilities of the H-SLP 150 are selected. The H-SLP 150 receives a request for a position estimate for the SET 120 from SUPL agent 170 (202). The H-SLP 150 transmits a SUPL initiation message to the SET 120 to start a location session (204). The initiation message includes the service capabilities of the H-SLP 150 which may include the SUPL services supported by the H-SLP such as an ability to support one or more of: an immediate location service; deferred location service (e.g. periodic and different types of triggered location); delivery of assistance data; and a Generic SUPL session. The service capabilities may also provide the positioning protocol capabilities of the H-SLP 150. The SET 120 can then select the appropriate positioning protocol for use during the positioning session, thereby avoiding the selection of a positioning protocol that is not supported by the H-SLP 150, which may require either aborting the session and returning a failure response to SUPL Agent 170 or restarting the session with a different positioning protocol resulting in delay and wasted network resources. If desired, the initiation message from the H-SLP 150 may further include an intended positioning method. Further, the initiation message from the H-SLP 150 may include an intended quality of position parameter.

In response, the SET 120 transmits and the H-SLP 150 receives the capabilities of the SET 120 (206). The H-SLP 150 may receive a positioning initiation message from the SET 120, which may include the capabilities of the SET 120 (208). If desired, the SET 120 may also provide a positioning message (e.g. within the positioning initiation message) using a positioning protocol consistent with the service capabilities of the H-SLP 150. The H-SLP 150 communicates with the SET 120 to determine at least one position estimate for the SET 120 during SUPL positioning session (210). For example, the service may be an immediate location and a single immediate position may be produced. If the service is for deferred location, multiple positions may be periodically generated or generated based on other trigger events. The one or more position estimates are sent to the SUPL agent 170 (212).

Figure 3:
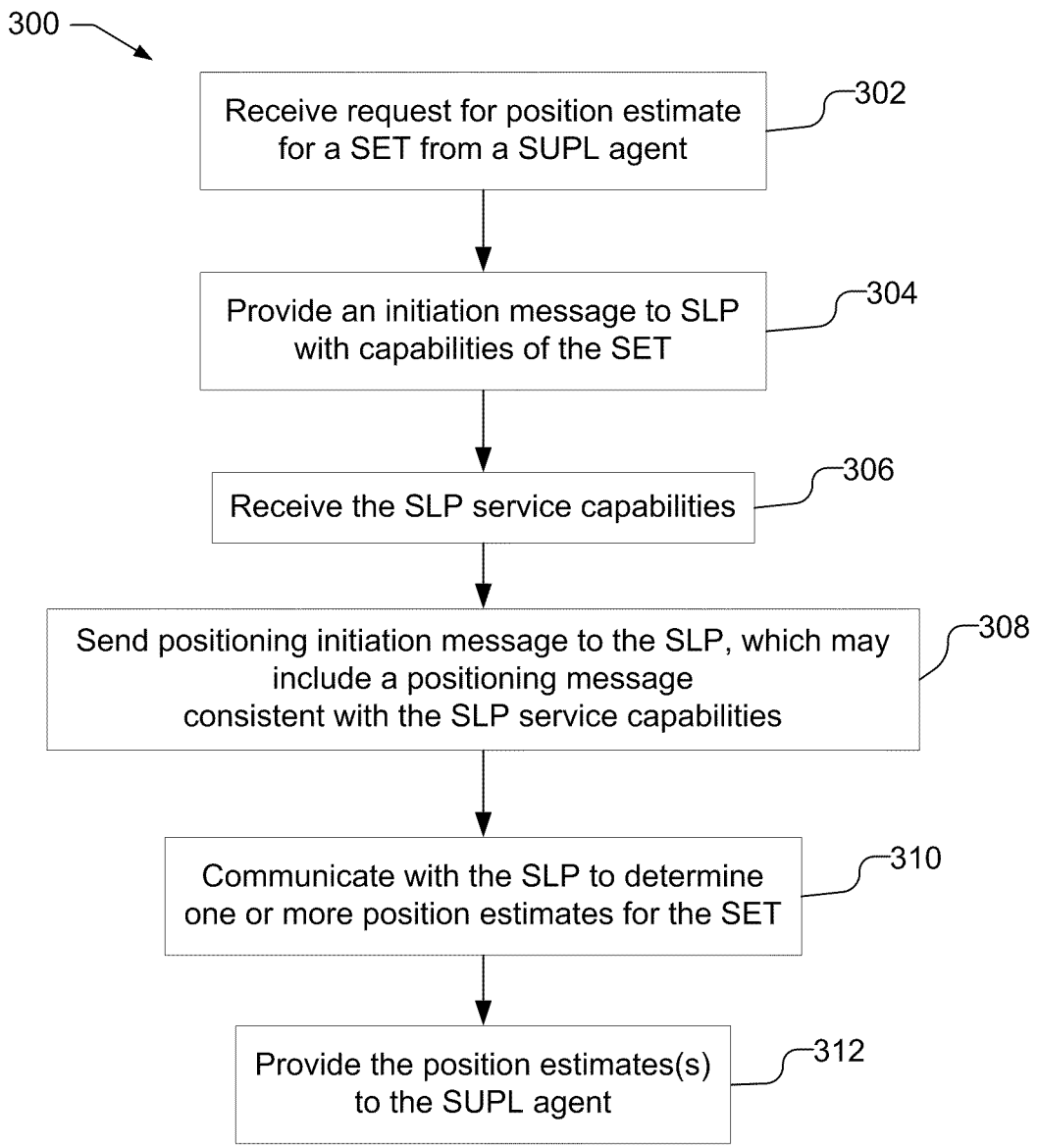
FIG. 3 is a flow chart illustrating a SUPL positioning process in which positioning protocols consistent with the capabilities of the H-SLP are selected.

FIG. 3 is a flow chart 300 illustrating a SUPL positioning process that may be performed by the SET 120 in SUPL ULP architecture 100, in which positioning protocols consistent with the capabilities of the H-SLP 150 are selected. The SET 120 receives a request for a position estimate for the SET 120 from SUPL agent 122 (302). The SET 120 provides an initiation message to the H-SLP 150 to start a location session (304). The initiation message includes the capabilities of the SET 120. If desired, the initiation message may include a quality of position parameter.

In response, the H-SLP 150 transmits and the SET 120 receives the service capabilities from the H-SLP 150 (306), which are received without a preceding request for the H-SLP service capabilities and which may include the SUPL services supported by the H-SLP such as an ability to support one or more of: an immediate location service; deferred location service (e.g. periodic and different types of triggered location); delivery of assistance data; and a Generic SUPL session. The H-SLP 150 service capabilities may also include the positioning protocols supported by H-SLP 150. By providing the positioning protocol capabilities of the H-SLP 150, the appropriate positioning protocol may be selected for use during the positioning session, thereby avoiding the selection of a positioning protocol that is not supported by the H-SLP 150, which may require either aborting or restarting the sessions with a different positioning protocol resulting in delays and wasted network resources. Additionally, the H-SLP 150 may transmit and the SET 120 receives an intended positioning method from the H-SLP 150 with the service capabilities of the H-SLP 150. The SET 120 may send a positioning initiation message, which may include the service capabilities of the SET 120 (308). If desired, the SET 120 may also provide a positioning message (e.g. within the positioning initiation message) using a positioning protocol consistent with the service capabilities of the H-SLP 150. The SET 120 communicates with the H-SLP 150 to determine at least one position estimate for the SET 120 during SUPL service delivery (310). For example, the service may be an immediate location and a single immediate position may be produced. If the service is for deferred location, multiple positions may be periodically generated or generated based on other trigger events. The SET 120 provides to the SUPL agent 122 at least one position estimate for the SET 120 during the SUPL service delivery session (312). For example, in SET-assisted mode, with the SUPL agent residing in the SET 120, the SET 120 may communicate with the H-SLP 150, which provides the position estimate to the SET 120 and the SET 120 provides the position estimate to the SUPL agent.

FIGS. 4-7 illustrate example call flows for the SUPL ULP architecture 100. The illustrated call flows provided herein use examples for single fix roaming and non-roaming services. It should be understood, however, that other services, such as triggered periodic service, and triggered area event service may similarly supported. The presented call flows are meant to illustrate the concept and do not contain details such as security, notification, etc.

Figure 4:
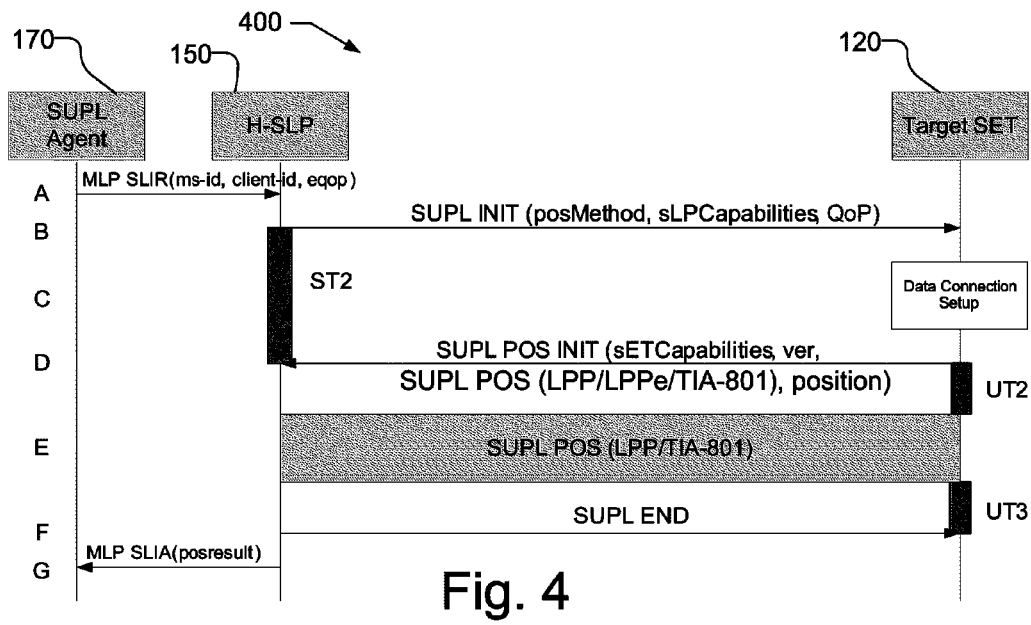
FIG. 4 shows an embodiment of a message flow for a network initiated single fix non-roaming service.

FIG. 4 shows an embodiment of a message flow 400 for a network initiated single fix non-roaming service. For network initiated services, the SUPL Agent 170 resides within the network and the service request is directed at the H-SLP 150. Before sending any ULP messages, the SET 120 establishes a secure connection (i.e., TLS connection) with the H-SLP 150. Establishing a secure connection can be achieved by establishing a new TLS connection, resuming a suspended TLS connection or reusing an existing TLS connection. Details of the TLS session (establishment, termination, etc.) are not shown.

SUPL agent 170 desires an immediate single position estimate for target SET 120 and sends a Mobile Location Protocol Standard Location Immediate Request (MLP SLIR) message to H-SLP 150 (step A). H-SLP 150 is an SLP with which SUPL agent 170 is associated. The MLP SLIR message may include a client identifier (ID) for SUPL agent 170 (client-id), a mobile station ID (ms-id) for target SET 120, and expected quality of position (eqop). The H-SLP 150 authenticates the SUPL Agent and checks if the SUPL Agent 170 is authorized for the service requested based on the client-id received. The H-SLP 150 may also provide privacy checking based on ms-id and client-id. For a privacy check, H-SLP 150 may verify if SUPL agent 170 or this type of SUPL agent is allowed to request immediate location information for SET 120 and whether SET 120 may need to be notified of this request and allowed to accept or reject the request. The eqop indicates the quality of the position estimates being requested, which may be quantified by the required accuracy of the position estimates and/or other criteria. The H-SLP 150 may also verify that the target SET 120 supports SUPL. The specifics for determining if the SET supports SUPL are beyond the scope of this document.

If a previously computed position that meets the requested eqop is available at the H-SLP 150 and no notification and verification is required, the H-SLP 150 may directly proceed to step G. If notification and verification or notification only is required, the H-SLP 150 proceeds to step B.

H-SLP 150 initiates a SUPL/location session with SET 120 by sending a SUPL INIT message, e.g., using Wireless Application Protocol (WAP) push, Short Message Service (SMS) trigger, or UDP/IP (step B). The SUPL INIT message may include an intended positioning method (posMethod), the SLP Capabilities (sLPCapabilities) of the H-SLP 150 and optionally the quality of position (QoP) and/or other information. The SLP Capabilities may indicate the positioning protocols supported by H-SLP 150 (e.g. LPP, LPPe, or TIA-801). The SUPL INIT message may also include a notification element if the result of the privacy check in step A indicates that notification or verification to target SET 120 is needed. For example, if in step A, the H-SLP 150 decided to use a previously computed position, the SUPL INIT message may indicate this in a 'no position' posMethod parameter value and the SET 120 may respond with a SUPL END message carrying the results of the verification process (access granted, or access denied). If no explicit verification is required (notification only) the SET 120 may respond with a SUPL END message. The H-SLP 150 may then directly proceed to step G. Additionally, before sending the SUPL END message, the SET 120 may perform the data connection setup procedure of step C and establish a TLS connection to the H-SLP 150, as described in step D. H-SLP 150 also computes and stores a hash of the SUPL INIT message prior to sending the message to SET 120.

The SET 120 analyses the received SUPL INIT message. If found not to be authentic, the SET 120 takes no further action. Otherwise, the SET 120 takes the required action to prepare for the establishment of a TLS data connection with the H-SLP 150 (step C). The SET also calculates the hash of the received SUPL INIT message.

The SET evaluates the notification rules and takes the appropriate action. The SET 120 may establish a TLS connection to the H-SLP 150 using the H-SLP 150 address provisioned by the Home Network. The SET 120 then sends a SUPL POS INIT message to start a positioning session with the H-SLP 150 (step D). The SET 120 may send the SUPL POS INIT message even if the SET 120 does not support the intended positioning method indicated in SUPL INIT. The SUPL POS INIT message contains the capabilities of the SET 120 (sETCapabilities) and the hash (ver) of the received SUPL INIT message calculated in step C. The SET capabilities may include the positioning methods supported by SET 120 (e.g., A-GPS SET assisted, and so on), the positioning protocols supported by SET 120 (e.g., RRLP, RRC, LPP, LPPe, TIA-801), and/or other information. Optionally, the SUPL POS INIT message may also include a SUPL POS message carrying LPP, LPPe and/or TIA-801 positioning protocol messages in line with the positioning protocol capabilities of the H-SLP 150 (indicated in step B in SLP Capabilities). Optionally, the SET 120 may also provide its position, if this is supported. If the SUPL POS INIT message contains a position which meets the requested QoP, the H-SLP 150 may directly proceed to step F and not engage in a SUPL POS session.

The H-SLP 150 may verify that the value of the ver parameter received in SUPL POS INIT in step D matches the one calculated and stored by the H-SLP 150 in step B. If the values do not match, the H-SLP 150 may directly move to step F and send a SUPL END message with status code 'authSuplinitFailure'.

SET 120 and H-SLP 150 engage in a SUPL POS message exchange to calculate a position (step E). The positioning methods and positioning protocol or protocols used for this session are determined based on the capabilities exchanged by the SET 120 and the H-SLP 150 during the SUPL POS message exchange or optionally in step D. The H-SLP 150 calculates the position estimate based on the received positioning measurements (SET-Assisted) or the SET calculates the position estimate based on assistance obtained from the H-SLP 150 (SET-Based).

Once the position calculation is complete, the H-SLP 150 sends a SUPL END message to the SET 120 indicating that the location session has ended (step F). The SET 120 then releases the TLS connection to the H-SLP 150 and releases all resources related to the session.

The H-SLP sends to the SUPL agent 170 a Standard Location Immediate Answer (MLP SLIA) message with the position estimate (posresult) and the H-SLP 150 releases all resources related to the session (step G).

Figure 5:
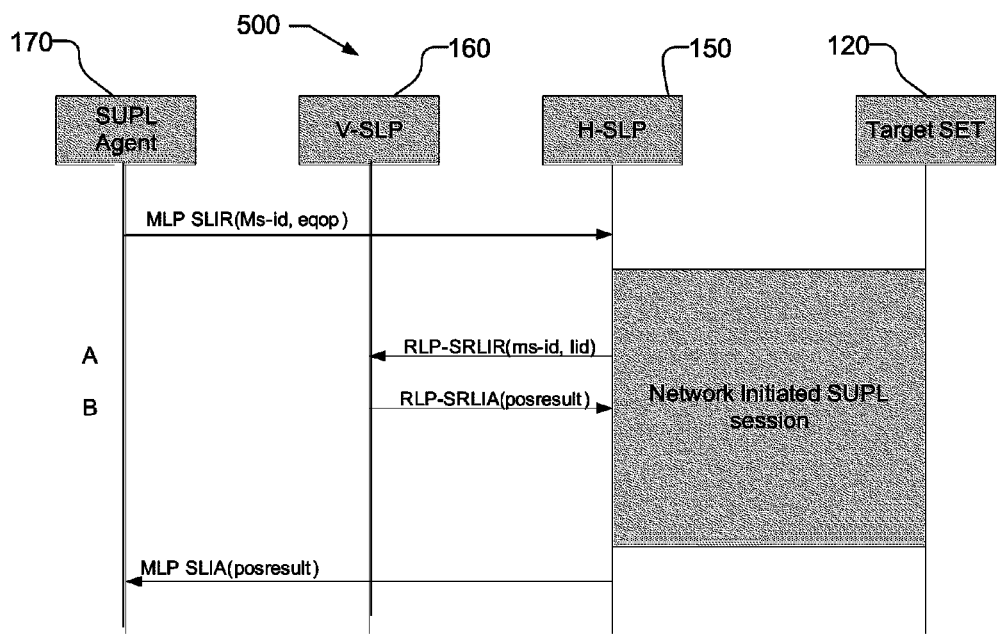
FIG. 5 shows an embodiment of a message flow for a network initiated single fix roaming service.

FIG. 5 shows an embodiment of a message flow 500 for a network initiated single fix roaming service. The roaming case assumes that R-SLP and H-SLP 150 are the same i.e., the SUPL Agent 170 communicates directly with the H-SLP 150.

For network initiated roaming, the ULP message exchange is the same as for non-roaming as discussed above in reference to FIG. 4. The ULP message exchange between the SET 120 and H-SLP 150 is therefore not explicitly shown in FIG. 5 but is indicated as "Network Initiated SUPL session" in the message flow. The V-SLP 160 is invoked if and when the H-SLP 150 requires translation of a cell or access point id into a position estimate.

In the course of the SUPL session, the H-SLP 150 requires translation of a cell or access point id into a position estimate. Since the SET 120 is SUPL roaming, the H-SLP 150 is unable to perform the translation on its own. The H-SLP 150 therefore engages the V-SLP 160 by sending a Roaming Location Protocol Standard Roaming Location Immediate Request (RLP-SRLIR) message to the V-SLP 160 including the ms-id and the location id (cell or access point id) (step A).

The V-SLP 160 translates the received cell or access point id into a position estimate and returns a Roaming Location Protocol Standard Roaming Location Immediate Answer (RLP SRLIA) message including the position (posresult) to the H-SLP 150 (step B).

Figure 6:
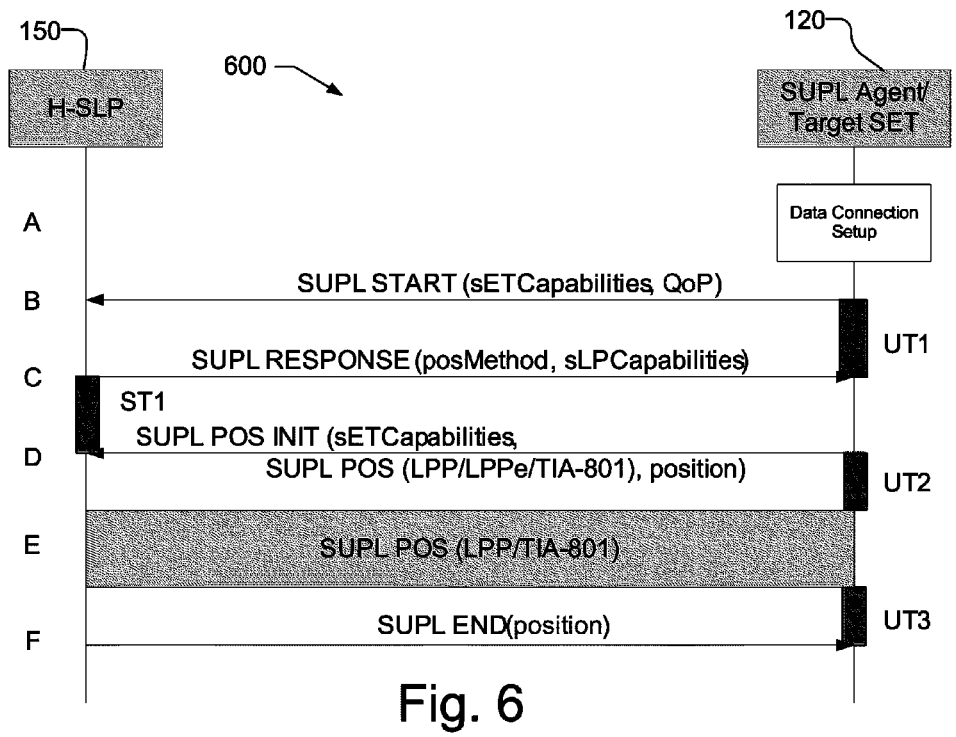
FIG. 6 shows an embodiment of a message flow for SET initiated single fix non-roaming service.

FIG. 6 shows an embodiment of a message flow 600 for SET initiated single fix non-roaming service. For SET initiated services, the SUPL agent 122 resides within the SET 120. Before sending any ULP messages, the SET 120 establishes a secure connection (i.e., TLS connection) with the H-SLP 150. This can be achieved by establishing a new TLS connection, resuming a suspended TLS connection or reusing an existing TLS connection. Details of the TLS session (establishment, termination, etc.) are not shown.

The SUPL Agent 122 on the SET 120 receives a position request from an application running on the SET 120. The SET takes appropriate action to establish a secure TLS connection to the H-SLP (step A). The SUPL Agent 122 on the SET 120 uses the default address provisioned by the home network to establish a secure TLS connection to the H-SLP 150 and sends a SUPL START message to start a positioning session with the H-SLP 150 (step B). The SUPL START message contains the capabilities of the SET 120 (sETCapabilities) and optionally the desired quality of position (QoP).

If a previously computed position that meets the requested QoP is available at the H-SLP 150, the H-SLP 150 directly proceeds to step F and sends a SUPL END message to the SET 120 including the position result (position). Otherwise, the H-SLP 150 sends a SUPL RESPONSE message to the SET 120 (step C). The SUPL RESPONSE message contains the intended positioning method (posMethod) and optionally the Capabilities of the H-SLP 150 (sLPCapabilities) which may indicate the positioning protocols supported by H-SLP 150 (e.g. LPP, LPPe or TIA-801).

The SET 120 sends a SUPL POS INIT message to the H-SLP 150 (step D). The SET 120 may send the SUPL POS INIT message even if the SET 120 does not support the intended positioning method indicated in SUPL RESPONSE. The SUPL POS INIT message contains the capabilities of the SET 120 (sETCapabilities) and optionally a SUPL POS message carrying LPP, LPPe and/or TIA-801 positioning protocol messages in line with the positioning protocol capabilities of the H-SLP 150 (indicated in step C in sLPCapabilities). The SET 120 may also provide its position, if this is supported. If the SUPL POS INIT message contains a position which meets the requested QoP, the H-SLP 150 directly proceed to step F and not engage in the SUPL POS session.

The SET 120 and H-SLP 150 engage in a SUPL POS message exchange to calculate a position (step E). The positioning methods and positioning protocol or protocols used for this session are determined based on the capabilities exchanged by the SET 120 and the H-SLP 150 during the SUPL POS message exchange or optionally in step D. The H-SLP 150 calculates the position estimate based on the received positioning measurements (SET-Assisted) or the SET 120 calculates the position estimate based on assistance obtained from the H-SLP (SET-Based).

Once the position calculation is complete, the H-SLP 150 sends a SUPL END message to the SET 120 indicating that the location session has ended (step F). If required, the H-SLP 150 may also send the position result (position) in SUPL END. The SET 120 then may release the TLS connection to the H-SLP 150 and release all resources related to this session. The H-SLP 150 releases all resources related to this session.

Figure 7:
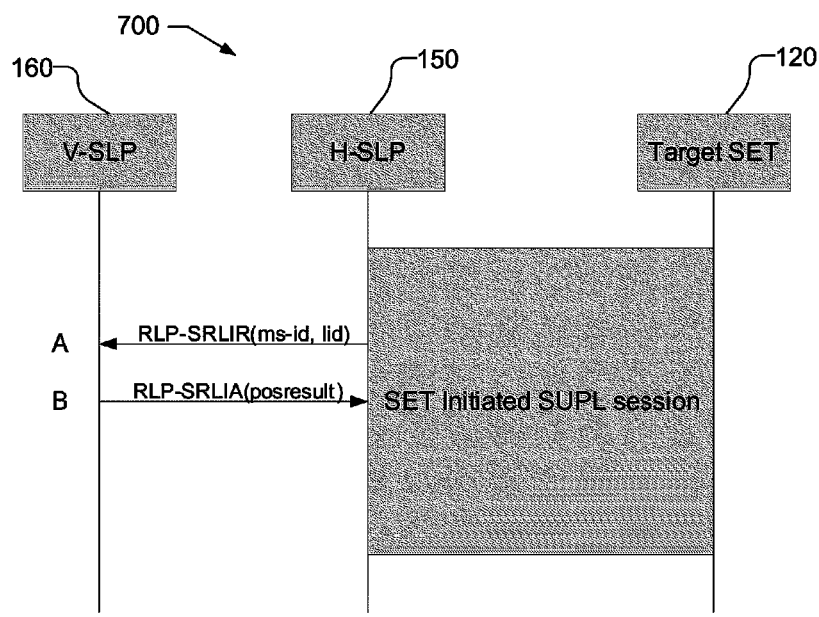
FIG. 7 shows an embodiment of a message flow for a SET initiated single fix roaming service.

FIG. 7 shows an embodiment of a message flow 700 for a SET initiated single fix roaming service. For SET initiated roaming, the ULP message exchange is the same as for non-roaming as discussed above in reference to FIG. 6. The ULP message exchange between the SET 120 and H-SLP 150 is therefore not explicitly shown in FIG. 7 but is indicated as "SET Initiated SUPL session" in the message flow. The V-SLP 160 is invoked if and when the H-SLP 150 requires translation of a cell or access point id into a position estimate.

In the course of the SUPL session, the H-SLP 150 requires translation of a cell or access point id into a position estimate. Since the SET 120 is SUPL roaming, the H-SLP 150 is unable to perform the translation on its own. The H-SLP 150 therefore engages the V-SLP 160 by sending a RLP-SRLIR message to the V-SLP 160 including the ms-id and the location id (cell or access point id) (step A).

The V-SLP 160 translates the received cell or access point id into a position estimate and returns a RLP SRLIA message including the position (posresult) to the H-SLP 150 (step B).

Figure 8:
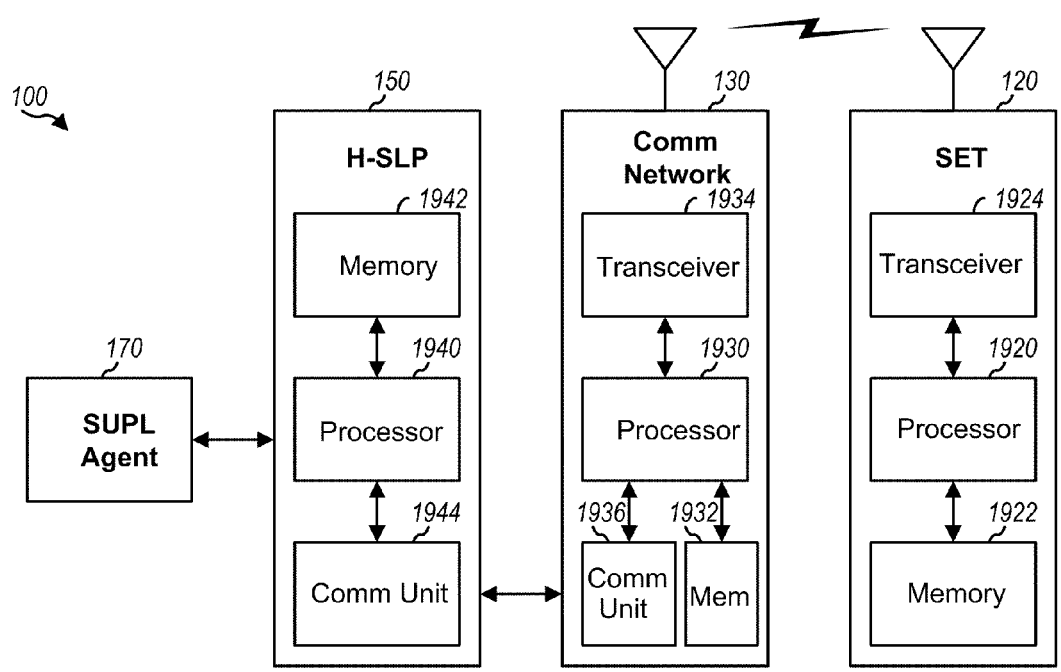
FIG. 8 shows a block diagram of an embodiment of the SET, H-SLP, and communication network in network architecture illustrated in FIG. 1.

FIG. 8 shows a block diagram an embodiment of SET 120, H-SLP 150, and communication network 130 in network architecture 100 in FIG. 1. Communication network 130 provides communication for terminals and may include base stations, wireless access points, femtocells, etc. and network controllers. For simplicity, FIG. 8 shows only one processor 1920, one memory unit 1922, and one transceiver 1924 for SET 120, only one processor 1930, one memory unit 1932, one transceiver 1934, and one communication (Comm) unit 1936 for network 130, and only one processor 1940, one memory unit 1942, and one communication (Comm) unit 1944 for H-SLP 150. In general, each entity may include any number of processors, memory units, transceivers, communication units, controllers, and so on. SET 120 may support wireless communication and may also receive and process GPS signals.

On the downlink, base stations, wireless access points, femtocells, etc., in network 130 transmit traffic data, signaling, and pilot to terminals within their coverage area. These various types of data are processed by processor 1930 and conditioned by transceiver 1934 to generate a downlink signal, which is transmitted via an antenna. At SET 120, the downlink signals from one or more base stations are received via an antenna, conditioned by transceiver 1924, and processed by processor 1920 to obtain various types of information for location services. For example, processor 1920 may decode messages used for the message flows described above. Memory units 1922 and 1932 store program codes and data for SET 120 and network 130, respectively. On the uplink, SET 120 may transmit traffic data, signaling, and pilot to one or more base stations in network 130. These various types of data are processed by processor 1920 and conditioned by transceiver 1924 to generate an uplink signal, which is transmitted via the SET antenna. At network 130, the uplink signals from SET 120 and other terminals are received and conditioned by transceiver 1934 and further processed by processor 1930 to obtain various types of information (e.g., data, signaling, reports, and so on). Network 130 communicates with H-SLP 150 and other network entities via communication unit 1936.

Within H-SLP 150, processor 1940 performs processing for the H-SLP, memory unit 1942 stores program codes and data for the H-SLP, and communication unit 1944 allows the H-SLP to communicate with SUPL agent 170, network 130, and other network entities. Processor 1940 may perform processing for H-SLP 150 for the message flows described above.

The techniques described herein may be implemented by various means. For example, the techniques may be implemented in hardware, firmware, software, or a combination thereof. For a hardware implementation, the units used to perform the processing at each entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. The software codes may be stored in a memory unit (e.g., memory unit 1922, 1932 or 1942 in FIG. 8) and executed by a processor (e.g., processor 1920, 1930 or 1940). The memory unit may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media and does not refer to transitory propagating signals. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus comprising:
at least one processor configured to:
receive from a Secure User Plane Location (SUPL) agent a request for position estimates for a SUPL enabled terminal (SET);
provide an initiation message to the SET to start a location session, the initiation message including information on capability of the processor to provide support for specific positioning protocols;
receive capabilities of the SET from the SET;
communicate with the SET to determine at least one position estimate for the SET; and
send the at least one position estimate to the SUPL agent.

2. The apparatus of claim 1, wherein the initiation message further includes service capabilities of the processor.

3. The apparatus of claim 1, wherein the positioning protocol capabilities of the processor are at least one of LPP, LPPe or TIA-801.

4. The apparatus of claim 1, wherein the processor is further configured to receive from the SET a positioning initiation message that includes a positioning message using a positioning protocol that is within the positioning protocol capabilities of the processor.

5. The apparatus of claim 1, wherein the initiation message further includes an intended positioning method.

6. The apparatus of claim 1, wherein the initiation message further includes a quality of position.

7. The apparatus of claim 1, wherein the processor is further configured to receive from the SET a positioning initiation message that includes positioning methods supported by the SET and positioning protocols supported by the SET.

8. A method comprising:
receiving from a Secure User Plane Location (SUPL) agent a request for position estimates for a SUPL enabled terminal (SET);
providing an initiation message from a SUPL Location Platform (SLP) to the SET to start a location session, the initiation message including information on capability of the SLP to provide support for specific positioning protocols;
receiving capabilities of the SET from the SET;
communicating with the SET to determine at least one position estimate for the SET; and
sending the at least one position estimate to the SUPL agent.

9. The method of claim 8, wherein the initiation message further includes service capabilities of the SLP.

10. The method of claim 8, wherein the positioning protocol capabilities of the SLP are at least one of LPP, LPPe or TIA-801.

11. The method of claim 8, further comprising receiving from the SET a positioning initiation message that includes a positioning message using a positioning protocol that is within the positioning protocol capabilities of the SLP.

12. The method of claim 8, wherein the initiation message further includes an intended positioning method.

13. The method of claim 8, wherein the initiation message further includes a quality of position.

14. A system comprising:
means for receiving from a Secure User Plane Location (SUPL) agent a request for position estimates for a SUPL enabled terminal (SET);
means for providing an initiation message from a SUPL Location Platform (SLP) to the SET to start a location session, the initiation message including information on capability of the SLP to provide support for specific positioning protocols;

means for receiving capabilities of the SET from the SET;

means for communicating with the SET to determine at least one position estimate for the SET; and means for sending the at least one position estimate to the SUPL agent.

15. The system of claim 14, wherein the initiation message further includes service capabilities of the SLP.

16. The system of claim 14, wherein the positioning protocol capabilities of the SLP are at least one of LPP, LPPe or TIA-801.

17. The system of claim 14, further comprising means for receiving from the SET a positioning initiation message that includes a positioning message using a positioning protocol that is within the positioning protocol capabilities of the SLP.

18. The system of claim 14, wherein the initiation message further includes an intended positioning method.

19. The system of claim 14, wherein the initiation message further includes a quality of position.

20. A computer-readable medium including program code stored thereon, comprising:

program code to receive from a Secure User Plane Location (SUPL) agent a request for position estimates for a SUPL enabled terminal (SET);

program code to provide an initiation message from a SUPL Location Platform (SLP) to the SET to start a location session, the initiation message including information on capability of the SLP to provide support for specific positioning protocols;

program code to receive capabilities of the SET from the SET;

program code to communicate with the SET to determine at least one position estimate for the SET; and program code to send the at least one position estimate to the SUPL agent.

21. The computer-readable medium of claim 20, wherein the initiation message further includes service capabilities of the SLP.

22. The computer-readable medium of claim 20, wherein the positioning protocol capabilities of the SLP are at least one of LPP, LPPe or TIA-801.

23. The computer-readable medium of claim 20, further comprising program code to receive from the SET a positioning initiation message that includes a positioning message using a positioning protocol that is within the positioning protocol capabilities of the SLP.

24. The computer-readable medium of claim 20, wherein the initiation message further includes an intended positioning method.

25. The computer-readable medium of claim 20, wherein the initiation message further includes a quality of position.

* * * * *